(12) United States Patent
Nishida et al.

(10) Patent No.: US 10,996,106 B2
(45) Date of Patent: May 4, 2021

(54) LUMINOUS BODY MEASUREMENT APPARATUS AND LUMINOUS BODY MEASUREMENT METHOD COMPRISING A CONTROL UNIT TO PIVOT A FIRST AND A SECOND ARM TO HOLD AN IMAGE PICKUP DEVICE IN PLURAL POSTURES

(71) Applicant: Otsuka Electronics Co., Ltd., Osaka (JP)

(72) Inventors: Yoshihiko Nishida, Hirakata (JP); Hiroyuki Sano, Hirakata (JP)

(73) Assignee: OTSUKA ELECTRONICS CO., LTD., Osaka (JP)

( * ) Notice: Subject to any disclaimer, the term of this patent is extended or adjusted under 35 U.S.C. 154(b) by 0 days.

(21) Appl. No.: 16/820,637

(22) Filed: Mar. 16, 2020

(65) Prior Publication Data

US 2020/0300693 A1 Sep. 24, 2020

(30) Foreign Application Priority Data

Mar. 18, 2019 (JP) .............................. JP2019-050291

(51) Int. Cl.
*G01J 1/42* (2006.01)
*G01J 1/04* (2006.01)

(52) U.S. Cl.
CPC ............... *G01J 1/42* (2013.01); *G01J 1/0403* (2013.01); *G01J 2001/4252* (2013.01)

(58) Field of Classification Search
CPC ........ A61B 5/0095; G01J 1/0403; G01J 1/42; G01J 2001/4252; G01N 29/0654
USPC .................................... 250/208.1, 214 R, 239
See application file for complete search history.

(56) References Cited

U.S. PATENT DOCUMENTS 6,590,643 B2 * 7/2003 Kubota ..................... G01J 1/04
356/121

FOREIGN PATENT DOCUMENTS

JP 2016151438 A 8/2016

* cited by examiner

*Primary Examiner* — Que Tan Le
(74) *Attorney, Agent, or Firm* — HEA Law PLLC

(57) ABSTRACT

To provide a luminous body measurement apparatus capable of being easily downsized, with which luminance of a luminous body can be measured in a wide range on a measurement sphere. The luminous body measurement apparatus is configured to pivot a first arm and a second arm in a non-inverted posture to obtain luminance data of a sample at a plurality of image pickup positions in a first region of the measurement sphere, and is configured to pivot the first arm and the second arm in an inverted posture to obtain luminance data of the sample at a plurality of image pickup positions in a second region adjacent to the first region, the non-inverted posture being a posture under which a supporting portion is located on one side of an axis as viewed from a holding portion, the inverted posture being a posture under which the supporting portion is located on another side of the axis as viewed from the holding portion.

10 Claims, 11 Drawing Sheets

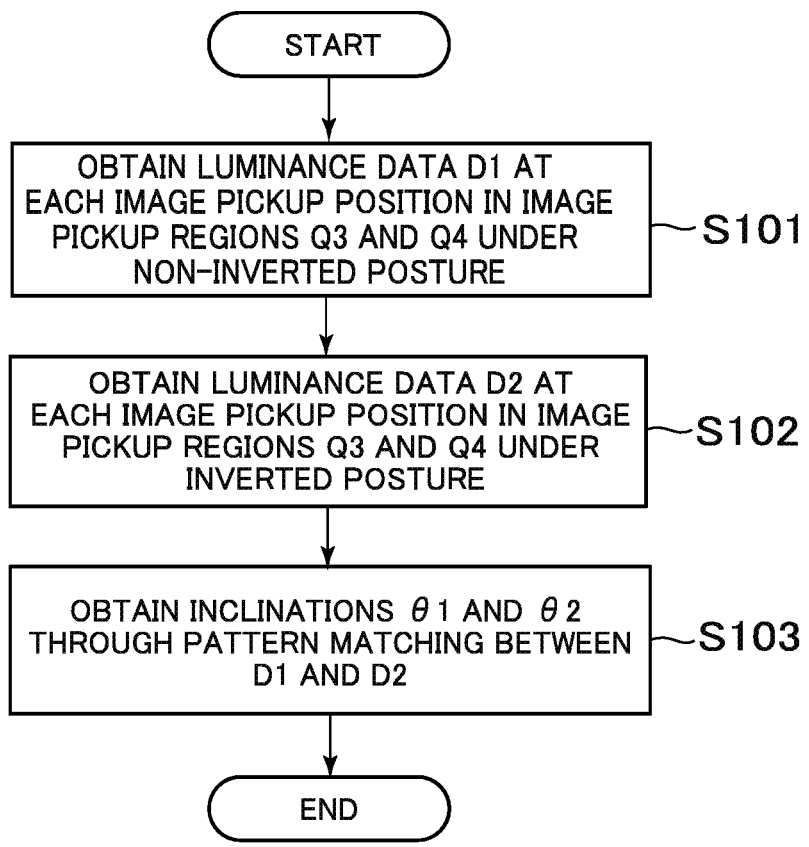

LUMINOUS BODY MEASUREMENT APPARATUS AND LUMINOUS BODY MEASUREMENT METHOD COMPRISING A CONTROL UNIT TO PIVOT A FIRST AND A SECOND ARM TO HOLD AN IMAGE PICKUP DEVICE IN PLURAL POSTURES

CROSS-REFERENCE TO RELATED APPLICATION

The present application claims priority from Japanese application JP2019-050291 filed on Mar. 18, 2019, the content of which is hereby incorporated by reference into this application.

BACKGROUND OF THE INVENTION

1. Field of the Invention

The present invention relates to a luminous body measurement apparatus and a luminous body measurement method, and more particularly, to a luminous body measurement apparatus and a luminous body measurement method, with which luminance data of a luminous body is obtained at a plurality of image pickup positions on a measurement sphere, and light distribution characteristic of the luminous body is calculated based on the luminance data obtained at the plurality of image pickup positions.

2. Description of the Related Art

The light distribution characteristic indicating the direction and intensity of light to be emitted from the luminous body is important information for designing lighting. For example, in designing of lighting with use of an LED as a luminous body, light is not always isotopically radiated from the LED, and hence it is important to thoroughly understand the light distribution characteristic of the luminous body.

One of methods that provide such light distribution characteristic is near-field distribution. This method is not to treat the luminous body as a point light source by approximation but to treat the luminous body as a light source of a certain size, and calculate light distribution characteristic different for each luminous portion of the luminous body. Through use of the light distribution characteristic of the luminous body obtained by the near-field distribution, optical characteristics of actual products such as general lighting, a light projector, and a head lamp can be accurately simulated.

With the near-field distribution, an image pickup device such as a camera is placed relatively closer to the luminous body and is changed in relative position to the luminous body so as to measure the luminance of each luminous portion of the luminous body from various directions on a measurement sphere centered on a reference position of the luminous body. For example, in Japanese Patent Application Laid-open No. 2016-151438 (see FIG. 2), an image pickup device is moved on the measurement sphere by a goniometer including an X-axis rotating arm and a Y-axis rotating arm configured to pivotably hold the X-axis rotating arm, to thereby measure the luminance of each luminous portion of a luminance body at each image pickup position on the measurement sphere. Upon the measurement, the luminous body is held at the center of the measurement sphere by a holding member.

When the related-art luminous body measurement apparatus described above is to be downsized, the X-axis rotating arm and the Y-axis rotating arm are brought close to the holding member. As a result, in particular, the X-axis rotating arm including the image pickup device is liable to interfere with the holding portion. Further, when the luminous body measurement apparatus is to be downsized, it is desired to provide an additional optical system so as to secure a sufficient optical length between the luminous body and an image pickup element such as a CCD incorporated in the image pickup device. In this case, the image pickup device is increased in size, and hence the X-axis rotating arm including the image pickup device is more liable to interfere with the holding member for the luminous body. In view of those circumstances, when the luminous body measurement apparatus is to be downsized, there arises a problem in that a movable range of the X-axis rotating arm is limited, and hence the luminance of the luminous body can be measured only in a limited region on the measurement sphere.

The present disclosure has been made to solve the above-mentioned problem, and it is an object of the present disclosure to provide a luminous body measurement apparatus capable of being easily downsized and a luminous body measurement method, with which luminance of a luminous body can be measured in a wide range on a measurement sphere.

In order to solve the above-mentioned problem, according to at least one embodiment of the present disclosure, there is provided a luminous body measurement apparatus including: an image pickup device configured to obtain luminance data of a luminous body; a first arm, which is provided so as to be pivotable by 360 degrees about a first axis set to be directed to a reference position at a distant position from the reference position, and which is configured to hold the image pickup device so as to obtain luminance data of the luminous body placed at the reference position, at each image pickup position on a first circular trajectory that passes a measurement sphere centered on the reference position, and that is perpendicular to the first axis and has the same diameter as the measurement sphere; a second arm, which includes a supporting portion configured to support the first arm so that the first arm is pivotable about the first axis, which is provided so as to be pivotable by 180 degrees or more about a second axis extending through the reference position and being perpendicular to the first axis, and which is configured to turn the first axis along a second circular trajectory that passes the measurement sphere, and that is perpendicular to the second axis and has the same diameter as the measurement sphere, with the first axis being directed to the reference position; a holding portion which is located on the second circular trajectory, and extends toward the reference position side to hold the luminous body at the reference position; and a control unit, which is configured to pivot the first arm and the second arm in a first posture in a range causing no interference with the holding portion to obtain luminance data of the luminous body at a plurality of the image pickup positions in a first region of the measurement sphere, and is configured to pivot the first arm and the second arm in a second posture in a range causing no interference with the holding portion to obtain luminance data of the luminous body at a plurality of the image pickup positions in a second region adjacent to the first region on one side of the second axis as viewed from a position of the holding portion, the first posture being a posture under which the supporting portion is located on one side of the second axis as viewed from the holding portion, and the image pickup position of the first arm is located at a more distant position from the holding portion than the supporting portion as viewed from the holding portion, the second posture being a posture under which the supporting portion is located on another side of the second axis as viewed from the holding portion, and the image pickup position of the first arm is located at a more distant position from the holding portion than the supporting portion as viewed from the holding portion.

Further, according to at least one embodiment of the present disclosure, there is provided a luminous body measurement method using a luminous body measurement apparatus, the luminous body measurement apparatus including: an image pickup device configured to obtain luminance data of a luminous body; a first arm, which is provided so as to be pivotable by 360 degrees about a first axis set to be directed to a reference position at a distant position from the reference position, and which is configured to hold the image pickup device to obtain luminance data of the luminous body placed at the reference position, at each image pickup position on a first circular trajectory that passes a measurement sphere centered on the reference position, and that is perpendicular to the first axis and has the same diameter as the measurement sphere; a second arm, which includes a supporting portion configured to support the first arm so that the first arm is pivotable about the first axis, which is provided so as to be pivotable by 180 degrees or more about a second axis extending through the reference position and being perpendicular to the first axis, and which is configured to turn the first axis along a second circular trajectory that passes the measurement sphere, and that is perpendicular to the second axis and has the same diameter as the measurement sphere, with the first axis being directed to the reference position; and a holding portion which is located on the second circular trajectory, and extends toward the reference position side to hold the luminous body at the reference position, the luminous body measurement method comprising: pivoting the first arm and the second arm in a first posture in a range causing no interference with the holding portion so as to obtain luminance data of the luminous body at a plurality of the image pickup positions in a first region of the measurement sphere; and pivoting the first arm and the second arm in a second posture in a range causing no interference with the holding portion to obtain luminance data of the luminous body at a plurality of the image pickup positions in a second region adjacent to the first region on one side of the second axis as viewed from a position of the holding portion, the first posture being a posture under which the supporting portion is located on one side of the second axis as viewed from the holding portion, and the image pickup position of the first arm is located at a more distant position from the holding portion than the supporting portion as viewed from the holding portion, the second posture being a posture under which the supporting portion is located on another side of the second axis as viewed from the holding portion, and the image pickup position of the first arm is located at a more distant position from the holding portion than the supporting portion as viewed from the holding portion.

BRIEF DESCRIPTION OF THE DRAWINGS

FIG. 11 is a flow chart for illustrating calculation processing for obtaining an inclination of the optical axis of the image pickup device.

DETAILED DESCRIPTION OF THE INVENTION

Now, an embodiment of the present disclosure is described in detail with reference to the drawings.

Figure 1:
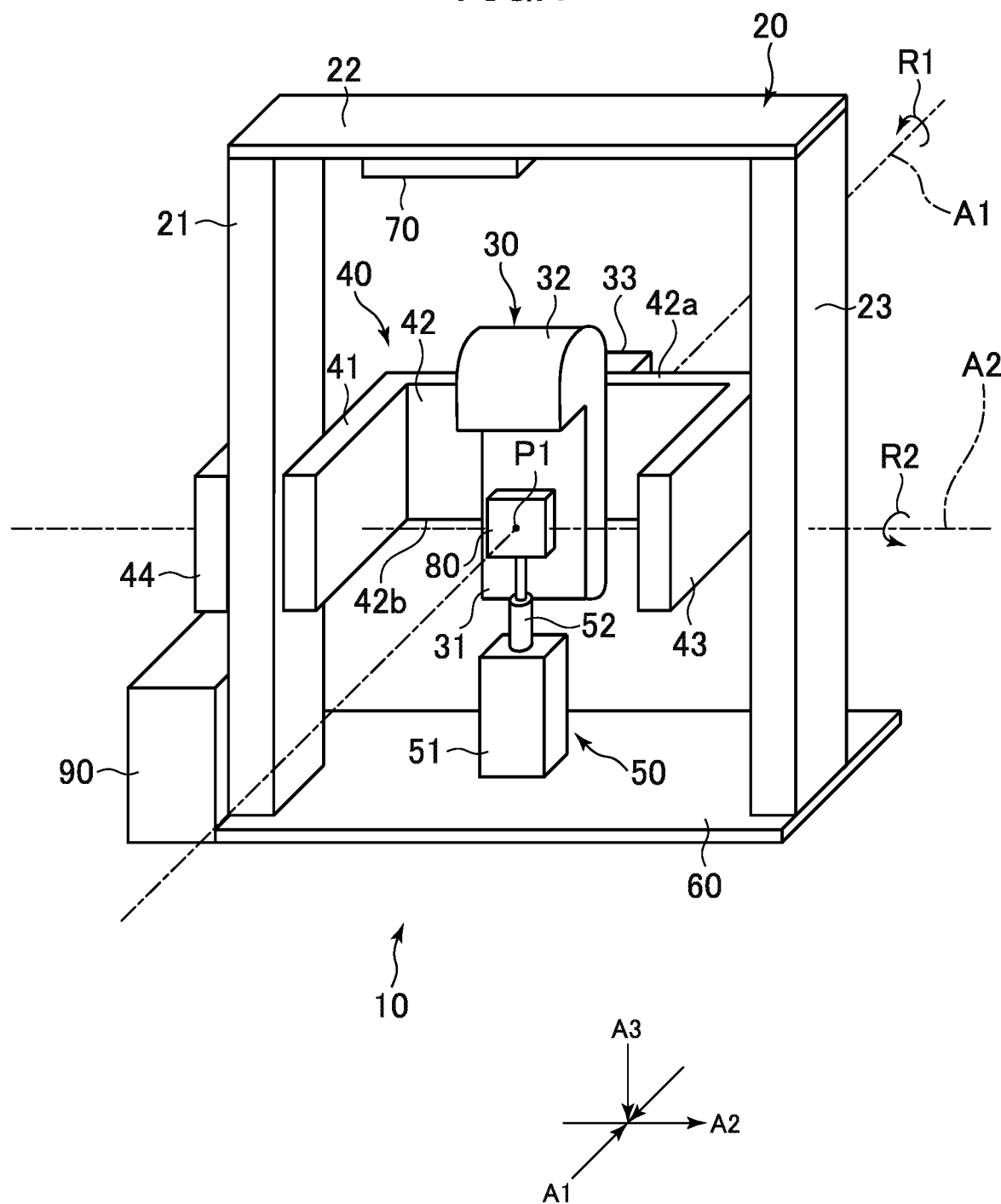
FIG. 1 is an external perspective view for illustrating a luminous body measurement apparatus according to an embodiment of the present disclosure.

FIG. 1 is an external perspective view for illustrating a luminous body measurement apparatus according to an embodiment of the present disclosure. A luminous body measurement apparatus 10 of FIG. 1 is configured to perform near-field distribution measurement. In the luminous body measurement apparatus 10, a holding portion 50 is provided at the center of a planar stage 60 placed at a bottom portion of the luminous body measurement apparatus 10. The holding portion 50 is configured to hold a sample 80 as a luminous body such as an LED in a reference position P1. The sample 80 is connected to power supply wiring (not shown) and is allowed to emit light at any timing. The holding portion 50 includes an adjustment mechanism 51 placed at the center of the stage 60, and a holding bar 52 is mounted to the adjustment mechanism 51 so as to extend upward. The sample 80 is fixed to a distal end of the holding bar 52. The adjustment mechanism 51 includes a plurality of actuators, for example, a stepping motor, with which the holding bar 52 can be freely moved in a front-back direction, a right-left direction, and an up-down direction in response to a user's operation input to an operation portion (not shown). With this, the user can operate the operation portion to set the sample 80 in the reference position P1. For example, the position of the sample 80 may be adjusted so that the center of the sample 80 matches the reference position P1. Alternatively, in a case of the sample 80 being a surface emitting device, the position of the sample 80 may be adjusted so that the center of a light emitting surface matches the reference position P1.

On the stage 60, a frame member 20 is provided to surround right and left, and upper sides of the sample 80. The frame member 20 includes a column 21 and a column 23. The column 21 is provided upright at a left end of the stage 60. The column 23 is provided upright at a right end of the stage 60 to face the column 21. The columns 21 and 23 have inner side surfaces opposed in parallel to each other. The column 21 and the column 23 have the same height, and a bridge 22 having a thin plate shape is provided on upper ends of the column 21 and the column 23 so as to extend therebetween. An illuminance sensor 70 is mounted to a lower surface of the bridge 22 so as to measure illuminance of the sample 80 at a predetermined position.

A second arm (X-axis rotating arm) 40 being a frame member having a substantially U-shape is provided between the inner side surfaces of the columns 21 and 23 and is supported by the columns 21 and 23 to pivot about an axis A2. The axis A2 is a fixed axis being parallel to the stage 60 and extending in the right-left direction through the reference position P1. On the other hand, an axis A1 to be described below is a movable axis being parallel to the stage 60 and extending in the front-back direction through the reference position P1 when the second arm 40 is in an initial posture as illustrated in FIG. 1. The axis A1, however, turns along with the pivoting of the second arm 40 while being directed to the reference position P1. Further, a movable axis being perpendicular to the axis A1 and the axis A2 and extending through the reference position P1 is defined as an axis A3. The direction of the axis A3 corresponds to an image pickup direction in design. Here, the term "A1 positive direction" refers to a direction from a distant position from the reference position P1 toward the reference position P1 along the axis A1, and the term "A1 negative direction" refers to a direction opposite to the A1 positive direction. The term "A2 positive direction" refers to a rightward direction along the axis A2, and the term "A2 negative direction" refers to a leftward direction along the axis A2. Further, the term "A3 positive direction" refers to a direction from a distant position from the reference position P1 toward the reference position P1 along the axis A3, and the term "A3 negative direction" refers to a direction to the A3 positive direction.

The second arm 40 includes an extending portion 41 and an extending portion 43. The extending portion 41 is supported by the column 21 so as to be pivotable about the axis A2. The extending portion 43 is supported by the column 23 so as to be pivotable about the axis A2. The extending portion 41 and the extending portion 43 are apart from each other and extend in the same direction. Specifically, both the extending portions 41 and 43 extend in a direction perpendicular to the axis A2. A planar supporting portion 42 is provided on distal ends of the extending portions 41 and 43 so as to extend therebetween. The supporting portion 42 is placed with its inner surface facing the axis A2; the inner surface of the supporting portion 42 is in parallel to the axis A2. On an outer side surface of the column 21, that is, a surface of the column 21 opposite to the surface having the extending portion 41 provided thereon, a stepping motor 44 configured to drive the second arm 40 to rotate about the axis A2 is mounted. Here, driving to rotate the second arm 40 in a counterclockwise direction as viewed from the A2 positive direction, that is, a direction of the arrow R2 is referred to as "forward rotation driving", and driving to rotate the second arm 40 in a clockwise direction as viewed from the A2 positive direction, that is, in a direction opposite to the direction of the arrow R2 is referred to as "reverse rotation driving".

At a center position of the inner surface of the supporting portion 42 of the second arm 40 in a longitudinal direction, a first arm 30 (Y-axis rotating arm) is mounted so as to be pivotable about the axis A1. The first arm 30 is a box-like member having a substantially L-shape, and an image pickup device is provided therein as described below. The first arm 30 includes an extending portion 31 and a dome portion 32. The extending portion 31 has a thin box shape and extends parallel to the supporting portion 42. The dome portion 32 is provided on one end side of the extending portion 31 and protrudes in a direction perpendicular to the extending portion 31.

On a rear surface side of the extending portion 31, a pivot shaft (not shown) extending in a direction perpendicular to the extending portion 31 is provided. The pivot shaft is inserted through a shaft hole (not shown) formed in the supporting portion 42 of the second arm 40. On an outer side surface of the supporting portion 42, that is, a surface of the supporting portion 42 opposite to the surface having the extending portion 31 provided thereon, a stepping motor 33 is mounted (see FIG. 2). The stepping motor 33 drives the pivot shaft to thereby rotate the first arm 40 about the axis A1.

Here, driving the first arm 30 in a counterclockwise direction as viewed from a front side of the luminous body measurement apparatus 10, that is, in a direction of the arrow R1 is referred to as "forward rotation driving", and driving the first arm 30 in a clockwise direction as viewed from the front side, that is, in a direction opposite to the direction of the arrow R1 is referred to as "reverse rotation driving". The extending portions 41 and 43 of the second arm 40 are arranged with a larger distance than the maximum rotation diameter of the first arm 30, and hence the first arm 30 is rotatable in 360 degrees about the axis A1 without any interference with the second arm 40.

The luminous body measurement apparatus 10 further includes a control unit 90. The control unit 90 is configured with the use of a computer including a CPU and a memory. The control unit 90 is connected to the stepping motor 33, the stepping motor 44, the adjustment mechanism 51, a power switch of the sample 80, the illuminance sensor 70, an image pickup element 36 incorporated in the first arm 30 (as described below), and other components, and is configured to control those components. In particular, the control unit 90 can control the stepping motor 33 and the stepping motor 44 to set the first arm 30 and the second arm 40 in any posture. Further, the control unit 90 causes the image pickup element 36 to obtain two-dimensional luminance data at any timing. Further, the control unit 90 receives illuminance data obtained by the illuminance sensor 70, and the two-dimensional luminance data obtained by the image pickup element 36, and performs various kinds of information processing such as calculation of light distribution characteristic data of the sample 80 with the use of the received data.

Figure 2:
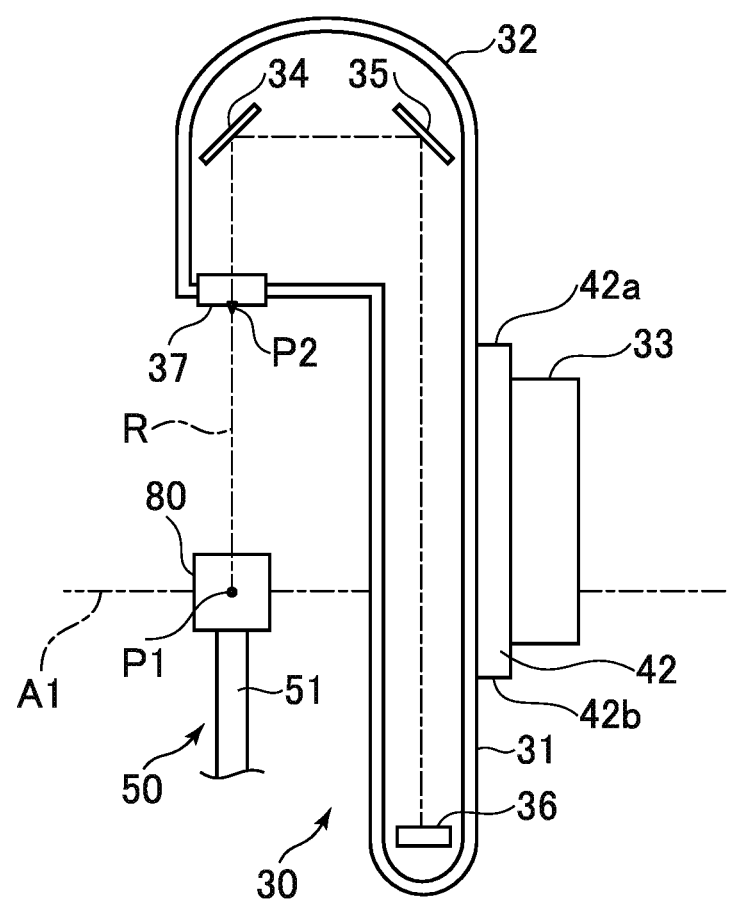
FIG. 2 is a partial sectional view for illustrating an internal configuration of a first arm.

FIG. 2 is a partial sectional view for illustrating an internal configuration of the first arm 30. FIG. 2 is an illustration of cross-section of the first arm 30 as viewed from the A2 positive direction. At a bottom portion of the extending portion 31, the image pickup element 36 such as a two-dimensional luminance sensor or a two-dimensional color luminance sensor is provided to face an extending direction of the extending portion 31. The dome portion 32 incorporates a mirror 35. The mirror 35 is located to face the front side of the image pickup element 36. Further, the dome portion 32 has an opening in a lower surface at a distal end thereof, and a cover glass 37 is provided at the opening. In the present application, a center position of the cover glass 37 being a portion through which light of an image of the sample 80 enters to the image pickup device, is referred to as "image pickup position P2". On an optical path from the image pickup position P2 to the image pickup element 36, an objective lens (not shown) is provided. An installation position of the objective lens is appropriately determined in accordance with magnification of the objective lens. The thus arranged objective lens, mirrors 34 and 35, and image pickup element 36 form the image pickup device.

The image pickup device has an optical axis R (in design) directed to the reference position P1, and the mirror 34 is provided on a line connecting the reference position P1 and the image pickup position P2. The light (image of the sample 80) having passed through the cover glass 37 is reflected by the mirror 34 in a direction parallel to the axis A1, specifically, toward the extending portion 31 side. The reflected light from the mirror 34 enters the mirror 35. The mirror 35 reflects the incident light toward the image pickup element 36 side, specifically, in the A3 positive direction. The reflected light from the mirror 35 travels across the axis A1 and reaches the image pickup element 36. With this, data of the image of the sample 80, that is, two-dimensional luminance data is generated. As described above, the objective lens is provided on the optical path from the image pickup position P2 to the image pickup element 36, and hence an enlarged image of the sample 80 is formed on the image pickup element 36. The two-dimensional luminance data contains luminance information for each of pixels arrayed two-dimensionally, and is transmitted to the control unit 90.

Since the image of the sample 80 is guided to the image pickup element 36 via the two mirrors 34 and 35 as described above, a long optical length can be secured between the image pickup element 36 and the sample 80. As a result, a required working distance (WD) can be secured even when the magnification of the objective lens is increased. Further, an optical filter can be provided on the optical path as appropriate. In particular, according to this embodiment, the image pickup element 36 and the mirror 35 are arranged on opposite sides across the axis A1, and hence an optical path length between the image pickup element 36 and the sample 80 can be increased considerably.

As described above, the first arm 30 is rotatable in 360 degrees about the axis A1 with respect to the supporting portion 42. Therefore, the first arm 30 can take a posture (non-inverted posture) under which the dome portion 32 is located above a surface 42a which is an upper surface of the supporting portion 42 defined when the second arm 40 is in the initial posture as illustrated in FIG. 1, or can take a posture (inverted posture) under which the dome portion 32 is located below a surface 42b which is a lower surface of the supporting portion 42.

Figure 3:
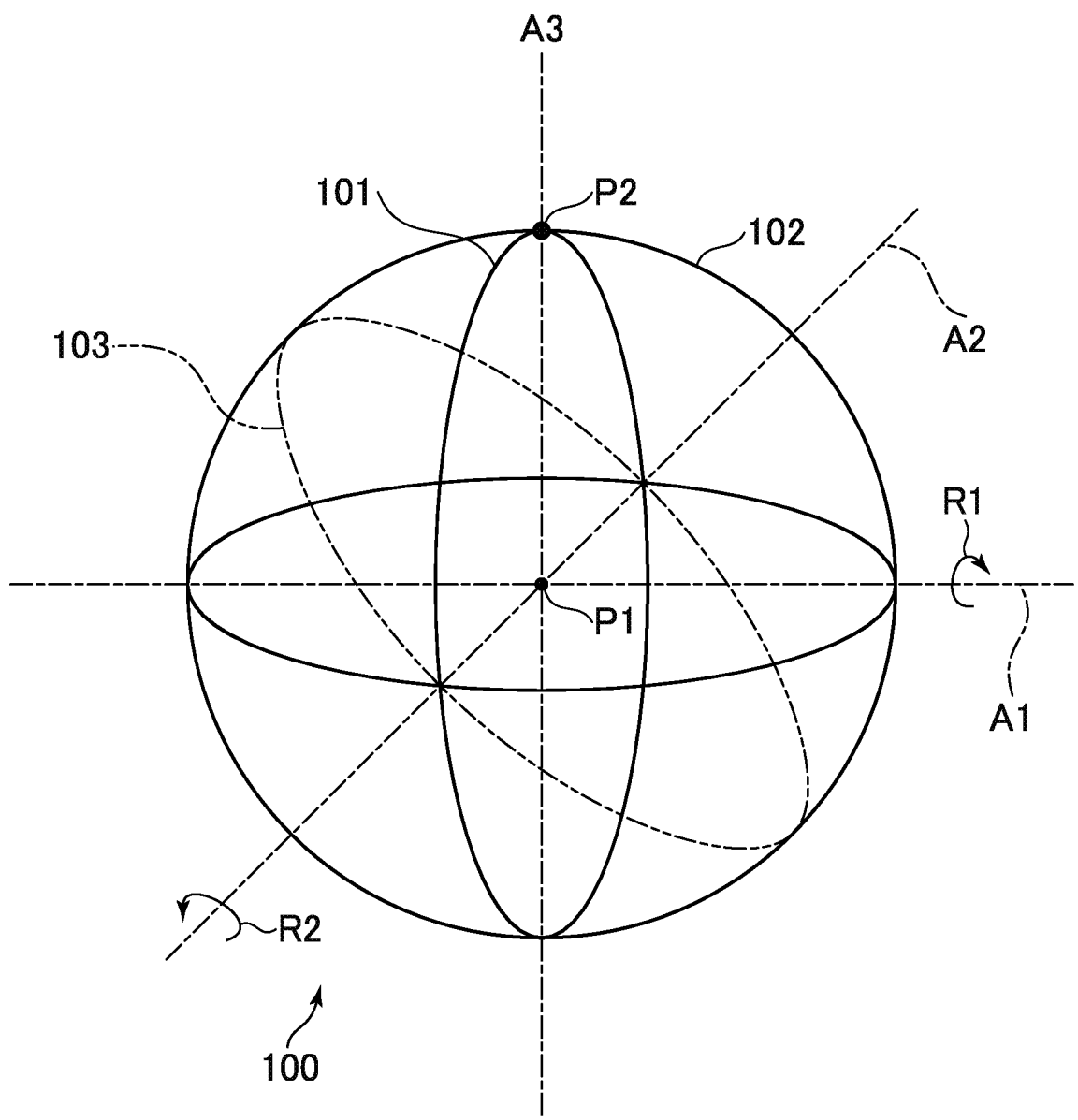
FIG. 3 is a view for illustrating a measurement sphere, a first circular trajectory, and a second circular trajectory of the luminous body measurement apparatus according to the embodiment of the present disclosure.

With the above-mentioned configuration, through the control for the stepping motor 33 and the stepping motor 44, the image pickup position P2 set at the distal end of the first arm 30 can be moved to any position on a measurement sphere centered on the reference position P1. FIG. 3 is a view for illustrating a relationship among the measurement sphere, a first circular trajectory, and a second circular trajectory of the luminous body measurement apparatus 10 according to the embodiment of the present disclosure. A measurement sphere 100 is a sphere centered on the reference position P1, and the image pickup position P2 can be set to any position on the measurement sphere 100 as long as the first arm 30 and the second arm 40 cause no interference with other portions.

That is, as the first arm 30 is rotated by the operation of the stepping motor 33, the image pickup position P2 can be moved along the first circular trajectory 101. The first arm 30 is supported by the supporting portion 42 so that the axis A1 corresponding to a pivot axis of the first arm 30 is always directed to the reference position P1. Further, the image pickup position P2 is set at the distal end of the first arm 30, and the image pickup position P2 is always located on the first circular trajectory 101. The first circular trajectory 101 is a circular trajectory having the same diameter as the measurement sphere 100. The center of the first circular trajectory 101 is the reference position P1, and the first circular trajectory 101 is perpendicular to the axis A1. As for the objective lens 37 provided at the image pickup position P2 of the first arm 30, the direction in design of the optical axis R thereof is toward the reference position P1. Further, the axis A1 corresponding to the pivot axis of the first arm 30 is also always directed to the reference position P1. Consequently, the direction in design of the optical axis R of the objective lens 37 is always toward the reference position P1 irrespective of the posture of the first arm 30. When the second arm 40 is in the initial posture as illustrated in FIG. 1, the image pickup position P2 is moved on the first circular trajectory 101 that passes a position directly above the reference position P1. However, when the second arm 40 is inclined, the first circular trajectory 101 is shifted to, for example, the location denoted by reference symbol 103, that is, the first circular trajectory 101 is inclined as illustrated in FIG. 3.

Further, the axis A2 corresponding to a pivot axis of the second arm 40 passes the reference position P1 as described above. The supporting portion 42 supports the first arm 30 so that the axis A1 is perpendicular to the axis A2 and that the axis A1 passes the reference position P1. Thus, when the stepping motor 44 is operated, a position at which the supporting portion 42 supports the first arm 30 is moved along a second circular trajectory 102. The second circular trajectory 102 is a circular trajectory having the same diameter as the measurement sphere 100. The center of the second circular trajectory 102 is the reference position P1, and the second circular trajectory 102 is perpendicular to the axis A2. With this configuration, when the stepping motor 44 is operated, the axis A1 is turned while being directed to the reference position P1.

Figure 4A:
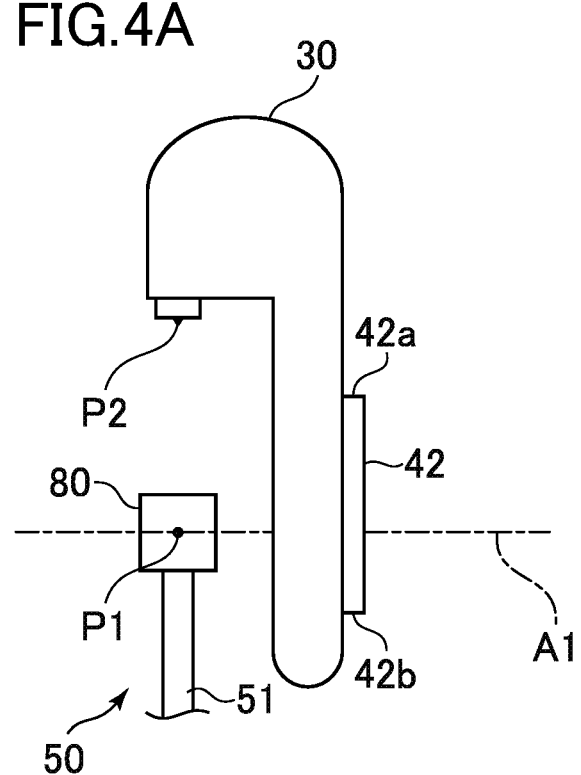
FIG. 4A is a view for illustrating how an image is captured when the first arm and a second arm are in a non-inverted posture.
Figure 4B:
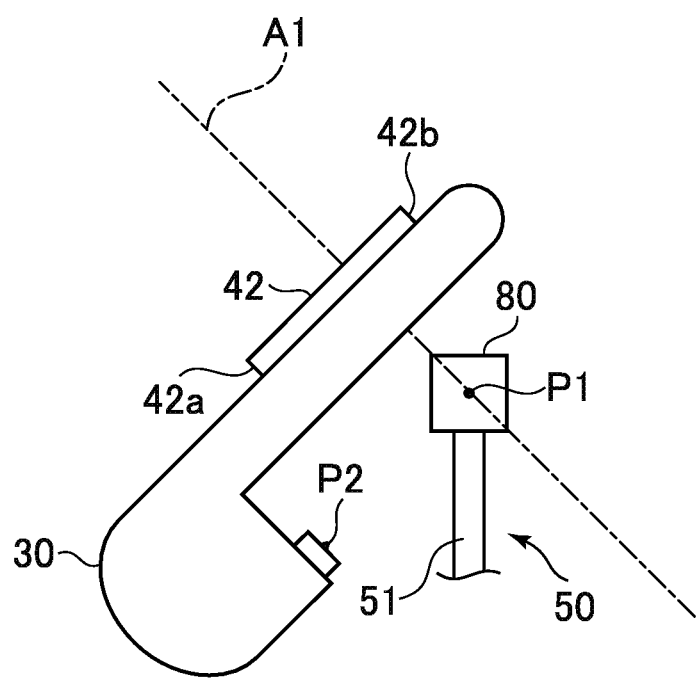
FIG. 4B is a view for illustrating how an image is captured when the first arm and the second arm are in the non-inverted posture.

Now, posture control for the first arm and the second arm is described in more detail. FIG. 4A and FIG. 4B are views for illustrating how an image is captured when the first arm 30 and the second arm 40 are in the non-inverted posture. FIG. 4A and FIG. 4B are illustrations of the first arm 30 and the supporting portion 42 as viewed from the A2 positive direction. FIG. 4A is an illustration of image pickup under a state in which the image pickup position P2 is located directly above the reference position P1. FIG. 4B is an illustration of image pickup under a state in which the image pickup position P2 is located to the lower front of and below the reference position P1. Under the non-inverted posture, the supporting portion 42 is located on one side of the axis A2 as viewed from the holding portion 50, that is, in a rear portion of the luminous body measurement apparatus 10, and the image pickup position P2 is more distant from the holding portion 50 than the supporting portion 42 as viewed from the holding portion 50. Under this non-inverted posture, the control unit 90 can control the stepping motor 44 to perform forward rotation driving so as to move the image pickup position P2 to any position in a wide region on the measurement sphere 100 in front of the reference position P1 without any interference of the first arm 30 and the second arm 40 with the holding portion 50, and to obtain luminance data of the sample 80 at each image pickup position P2.

Figure 5A:
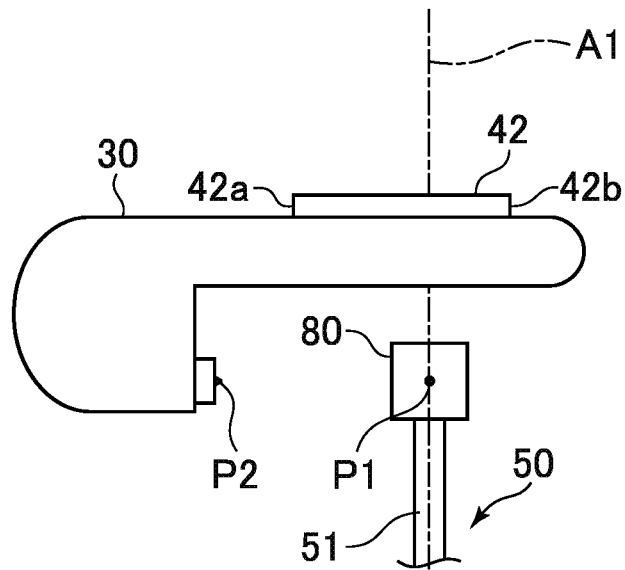
FIG. 5A is a view for illustrating an inverting operation (before inversion) of the first arm.
Figure 5B:
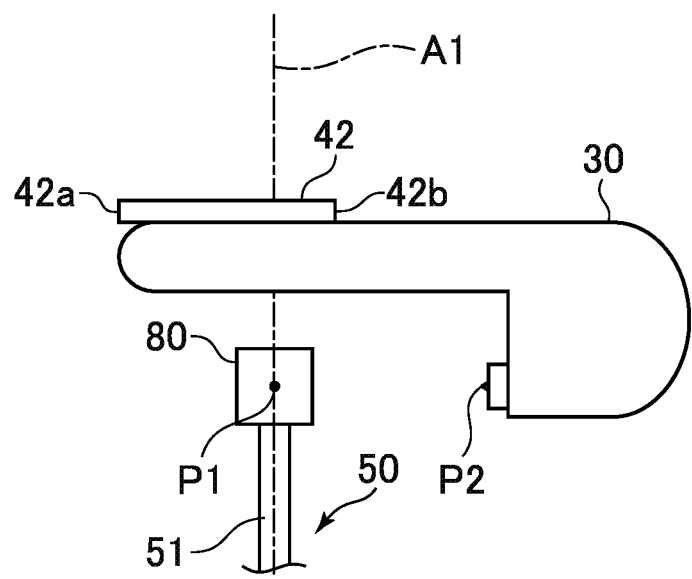
FIG. 5B is a view for illustrating an inverting operation (after inversion) of the first arm.

FIG. 5A and FIG. 5B are views for illustrating an inverting operation of the first arm 30. FIG. 5A and FIG. 5B are also illustrations of the first arm 30 and the supporting portion 42 as viewed from the A2 positive direction. In FIG. 5A, the second arm 40 is in a retreated posture. In FIG. 5A, the first arm 30 is in a posture before inversion. In FIG. 5B, the second arm 40 is in the retreated posture. In FIG. 5B, the first arm 30 is in a posture after inversion. After having set the first arm 30 and the second arm 40 in the non-inverted posture to obtain luminance data of the sample 80 at a large number of image pickup positions P1 in front of the reference position P1, the control unit 90 causes the first arm 30 to be inverted with respect to the supporting portion 42. Specifically, the control unit 90 first sets the second arm 40 in the retreated posture. The retreated posture is a posture of the second arm 40, which causes no interference with the holding portion 50 even when the first arm 30 rotates in 360 degrees (see image pickup regions Q1 and Q6 of FIG. 7). For example, as illustrated in FIG. 5A, a posture of the second arm 40 under which the supporting portion 42 is located above the reference position P1 corresponds to the retreated posture. In this state, as illustrated in FIG. 5B, the image pickup position P2 of the first arm 30 is moved to an opposite side with respect to the supporting portion 42. After that, through the forward rotation driving of the second arm 40, the first arm 30 and the second arm 40 can be set in the inverted posture.

Figure 6A:
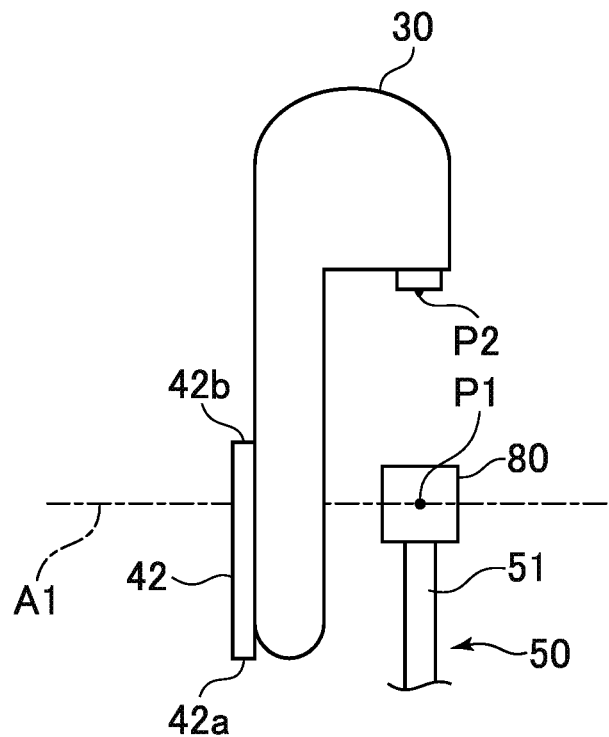
FIG. 6A is a view for illustrating how an image is captured when the first arm and the second arm are in an inverted posture.
Figure 6B:
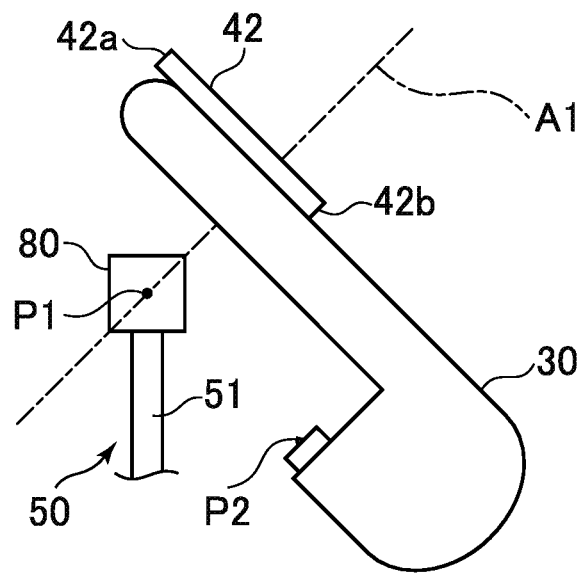
FIG. 6B is a view for illustrating how an image is captured when the first arm and the second arm are in the inverted posture.

FIG. 6A and FIG. 6B are views for illustrating how an image is captured when the first arm 30 and the second arm 40 are in the inverted posture. FIG. 6A and FIG. 6B are also illustrations of the first arm 30 and the supporting portion 42 as viewed from the A2 positive direction. FIG. 6A is an illustration of image pickup under a state in which the image pickup position P2 is located directly above the reference position P1. FIG. 6B is an illustration of image pickup under a state in which the image pickup position P2 is located to the lower back of the reference position P1. Under the inverted posture, the supporting portion 42 is located on the front side of the axis A2 as viewed from the holding portion 50, and the image pickup position P2 is more distant from the holding portion 50 than the supporting portion 42 as viewed from the holding portion 50. Under this inverted posture, the control unit 90 can control the stepping motor 44 to perform reverse rotation driving so as to move the image pickup position P2 to any position in a wide region on the measurement sphere 100 behind the reference position P1 without any interference of the first arm 30 and the second arm 40 with the holding portion 50, and to obtain luminance data of the sample 80 at each image pickup position P2.

Figure 7:
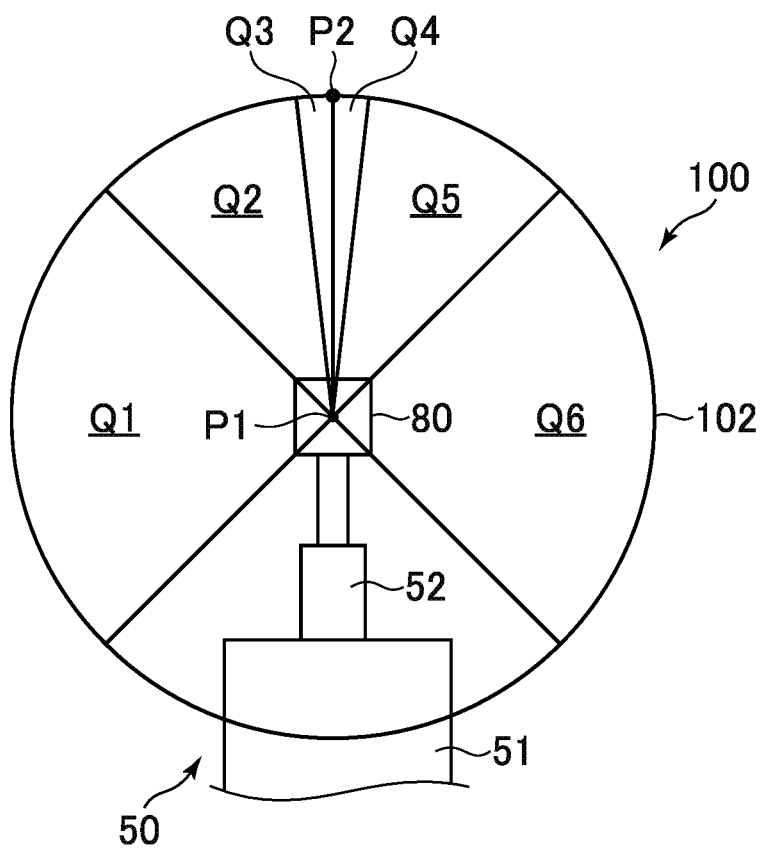
FIG. 7 is a view for illustrating a plurality of image pickup regions on the measurement sphere.

FIG. 7 is a view for illustrating a plurality of image pickup regions on the measurement sphere 100. FIG. 7 is an illustration of the measurement sphere 100 as viewed from the A2 positive direction. In FIG. 7, the outline of the measurement sphere 100 matches the second circular trajectory 102. In the luminous body measurement apparatus 10, the image pickup position P2 is set only in the image pickup regions Q1 to Q6 out of the entire region of the measurement sphere 100 so as to obtain luminance data of the sample 80. In the luminous body measurement apparatus 10, the holding portion 50 is located on the second circular trajectory 102, and hence when the image pickup position P2 is to be set in other regions, the dome portion 32 of the first arm 30 interferes with the holding portion 50.

First, in the image pickup region Q1 and the image pickup region Q6, the image pickup position P2 can be located irrespective of whether the first arm 30 and the second arm 40 are in the non-inverted posture or in the inverted posture. That is, a lower limit position of the image pickup region Q1 matches the image pickup position P2 obtained just before the dome portion 32 of the first arm 30 in the non-inverted posture is nearly brought into contact with the holding portion 50 (see FIG. 4B). Further, when the first arm 30 in this state is inverted by 360 degrees, the image pickup position P2 matches an upper limit position of the image pickup region Q6. Further, a lower limit position of the image pickup region Q6 matches the image pickup position P2 obtained just before the dome portion 32 of the first arm 30 in the inverted posture is nearly brought into contact with the holding portion 50 (FIG. 6B). Further, when the first arm 30 in this state is inverted by 360 degrees, the image pickup position P2 matches an upper limit position of the image pickup region Q1. In the image pickup region Q1 and the image pickup region Q6, the first arm 30 can be rotated in 360 degrees.

As illustrated in FIG. 4A, when the image pickup position P2 is located directly above the reference position P1 under the non-inverted posture, there is a slight space between a lower end portion of the first arm 30 and the holding portion 50. With this, the second arm 40 can be driven to reversely rotate a little from the state of FIG. 4A. Further, as illustrated in FIG. 6A, when the image pickup position P2 is located directly above the reference position P1 under the inverted posture as well, there is a slight space between the lower end portion of the first arm 30 and the holding portion 50. With this, the second arm 40 can be driven to rotate forward a little from the state of FIG. 6A. In view of this, also in the image pickup regions Q3 and Q4, the image pickup position P2 can be located irrespective of whether the first arm 30 and the second arm 40 are in the non-inverted posture or in the inverted posture. It should be noted that the first arm 30 cannot be rotated in 360 degrees for fear that the dome portion 32 of the first arm 30 interfere with the holding portion 50, and thus is only allowed to rotate rightward and leftward from the position directly above the reference position P1 by less than 180 degrees, for example, about 120 degrees.

Next, as for the image pickup region Q2, the image pickup position P2 can be located in this region only when the first arm 30 and the second arm 40 are in the non-inverted posture. Under the inverted posture, the lower end portion of the first arm 30 interferes with the holding portion 50, and hence the image pickup position P2 cannot be located in the image pickup region Q2. Similarly, as for the image pickup region Q5, the image pickup position P2 can be located in this region only when the first arm 30 and the second arm 40 are in the inverted posture. Under the non-inverted posture, the lower end portion of the first arm 30 interferes with the holding portion 50, and hence the image pickup position P2 cannot be located in the image pickup region Q5.

In this embodiment, the control unit 90 sets the first arm 30 and the second arm in the non-inverted posture, and in this state, sets the image pickup position P2 in the image pickup regions Q1 to Q3 (first region) so as to obtain luminance data of the sample 80. Further, the control unit 90 sets the first arm 30 and the second arm in the inverted posture, and in this state, sets the image pickup position P2 in the image pickup regions Q4 to Q6 (second region) so as to obtain luminance data of the sample 80. For example, in each of the first region and the second region, the image pickup position P2 is moved in a direction of the first circular trajectory and a direction of the second circular trajectory at predetermined angular pitches, to thereby obtain luminance data of the sample 80 at each image pickup position P2. In all the image pickup regions Q1 to Q6, the first arm 30 is pivoted rightward and leftward by 90 degrees each, that is, 180 degrees in total from a reference posture of the first arm 30 (upright posture) under which the image pickup position P2 is located on the second circular trajectory 102, to thereby set the image pickup position P2 to a large number of positions in those regions and obtain luminance data of the sample 80. It should be noted that, in the image pickup regions Q2 to Q5, the first arm 30 can be rotated rightward and leftward by more than 90 degrees each from the upright posture of the first arm 30 as the reference posture as long as the dome portion 32 does not interfere with the holding portion 50. Further, a procedure of setting the image pickup position P2 is not limited to the above-mentioned example. When luminance data is to be obtained at the image pickup position P2 in the image pickup region Q1 under the non-inverted posture, the first arm 30 may be inverted to set the image pickup position P2 in the image pickup region Q6 so as to obtain luminance data in this region as well. Alternatively, when luminance data is to be obtained at the image pickup position P2 in the image pickup region Q6 under the inverted posture, the first arm 30 may be inverted to set the image pickup position P2 in the image pickup region Q1 so as to obtain luminance data in this region as well.

The second region is adjacently behind the first region. In this example, a boundary between the image pickup region Q3 and the image pickup region Q4 is set as the first circular trajectory 101 obtained when the image pickup position P2 is located vertically above the reference position P1, but any first circular trajectory between the first circular trajectory located at a front end of the image pickup region Q3 and the first circular trajectory located at a rear end of the image pickup region Q4 may be defined as a boundary between the image pickup region Q3 and the image pickup region Q4.

Figure 8A:
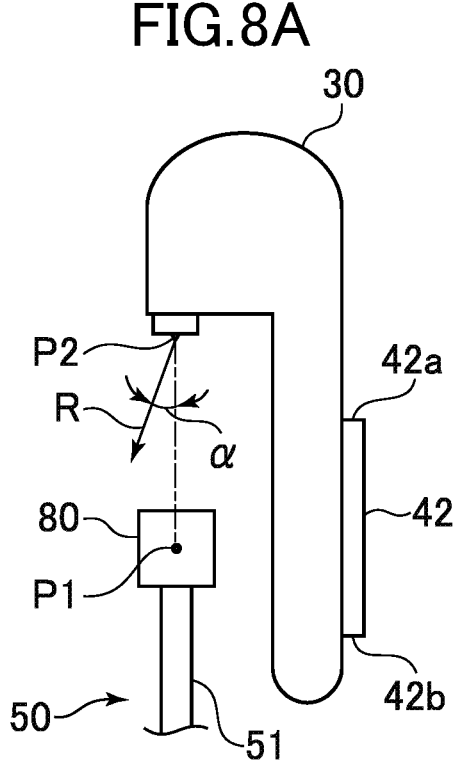
FIG. 8A is a view for illustrating an inclination of an optical axis in a front-back direction of an image pickup device when the first arm and the second arm are in the non-inverted posture.
Figure 8B:
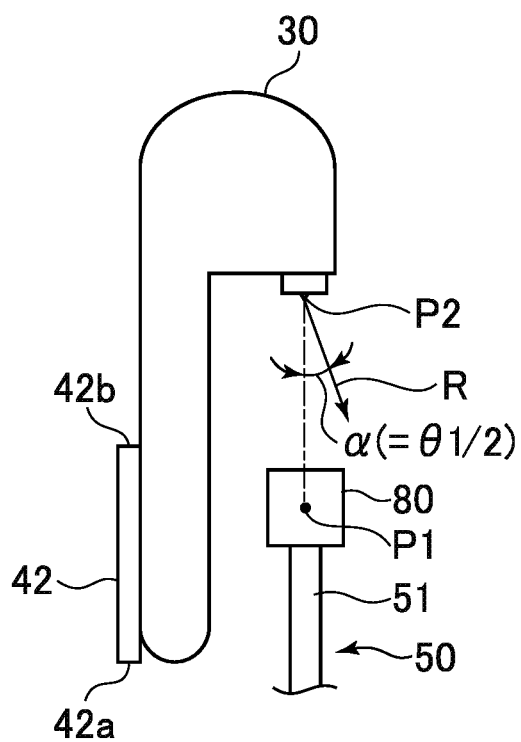
FIG. 8B is a view for illustrating an inclination of the optical axis in the front-back direction of the image pickup device when the first arm and the second arm are in the inverted posture.

The foregoing description is given on the assumption that the direction of the optical axis R of the image pickup device incorporated in the first arm 30 is aligned with the direction of the axis A3 as designed, but in some cases, the direction of the optical axis R may deviate from the direction of the axis A3. The deviation tends to occur, in particular, due to offset in installation angle of the mirrors 34 and 35. FIG. 8A is an illustration of an inclination α of the optical axis R of the image pickup device in the front-back direction under the non-inverted posture of the first arm 30 and the second arm 40. FIG. 8B is an illustration of the inclination α of the optical axis R of the image pickup device in the front-back direction under the inverted posture of the first arm 30 and the second arm 40. In this example, a direction of increasing a distance of the optical axis R from the extending portion 32 of the first arm 30 is defined as a positive direction. In FIG. 8A and FIG. 8B, the inclination α is illustrated as a large inclination in an exaggerated manner, but actually is about 0.1 degrees at most. With this inclination α, however, luminance data of the sample 80 captured at a certain image pickup position P2 under the non-inverted posture is substantially the same as luminance data captured at another image pickup position P2 obtained when the second arm 40 is driven to rotate by α therefrom (FIG. 8A). Likewise, luminance data of the sample 80 captured at a certain image pickup position P2 under the inverted posture is substantially the same as luminance data captured at another image pickup position P2 obtained when the second arm 40 is driven to rotate by α therefrom (FIG. 8B). In order to calculate light distribution characteristic data of the sample 80 in accordance with algorithm of near-field distribution, it is required to temporarily store in the control unit 90 luminance data obtained at each image pickup position P2 in accordance with data (including a position Y on the first trajectory given in angle, and a position X on the second trajectory 102 given in angle) of the image pickup position P2 at which the luminance data is obtained. However, when the optical axis R deviates only by α from the vertical direction, raw data (position X on the second trajectory 102) of a certain image pickup position P2 to be associated with luminance data obtained under the inverted posture, includes offset of about 2×α (=θ1) from raw data to be associated with luminance data obtained under the non-inverted posture. To address this, in this embodiment, the image pickup position P2 to be associated with luminance data obtained under the inverted posture is changed in accordance with an inclination θ1. Specifically, under the inverted posture, θ1 is added to the data of the position X. With this, a pair of luminance data obtained under the non-inverted posture and a certain image pickup position P2, and a pair of luminance data obtained under the inverted posture and a corresponding image pickup position P2 can be smoothly combined with each other, to thereby appropriately calculate light distribution characteristic data of the sample 80. In this example, alternatively, it is possible to change both of the certain image pickup position P2 to be associated with luminance data obtained under the non-inverted posture and the corresponding image pickup position P2 to be associated with luminance data obtained under the inverted posture. Specifically, α may be subtracted from data of the position X to be associated with the luminance data obtained under the non-inverted posture, and also α may be added to the data of the position X to be associated with the luminance data obtained under the inverted posture.

Figure 9:
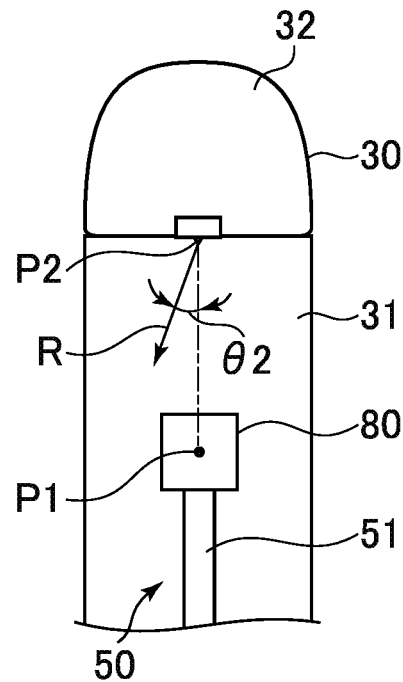
FIG. 9 is a view for illustrating an inclination of the optical axis in a right-left direction of the image pickup device.

Likewise, as illustrated in FIG. 9, the optical axis R of the image pickup device may be inclined also in the right-left direction. In this case, θ2 may be added to data of the position Y to be associated with luminance data obtained at each image pickup position P2, where θ2 represents an inclination of the optical axis R to the axis A3. Here, when the optical axis R is inclined to the left in the first arm 30 in the upright posture as viewed from the A1 positive direction, θ2 is assumed to take a positive value.

Figure 10A:
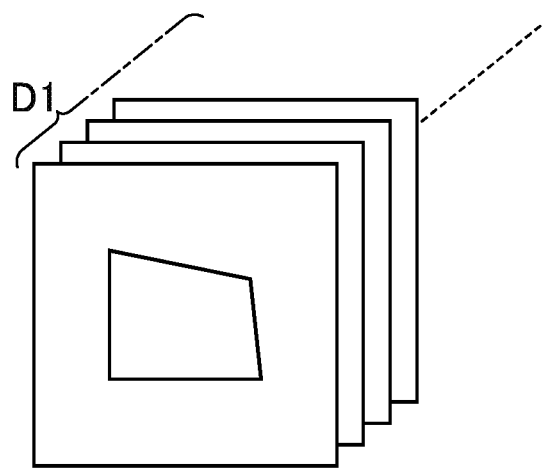
FIG. 10A and FIG. 10B are views for illustrating luminance data captured when the first arm and the second arm are in the non-inverted posture and in the inverted posture, respectively.
Figure 10B:
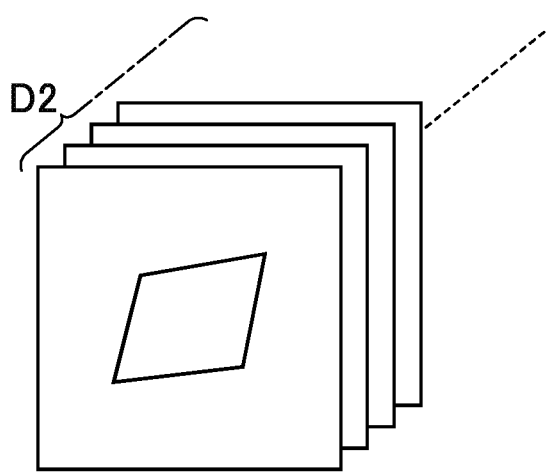

The inclinations θ1 and θ2 can be calculated through image processing by the control unit 90. FIG. 10A is an illustration of luminance data D1 obtained under the non-inverted posture of the first arm 30 and the second arm 40 at a plurality of image pickup positions P2 in the image pickup regions Q3 and Q4. FIG. 10B is an illustration of luminance data D2 obtained under the inverted posture of the first arm 30 and the second arm 40 at a plurality of image pickup positions P2 in the image pickup regions Q3 and Q4. For example, one of the luminance data D1 is selected, and similarity between the selected luminance data D1 and each luminance data D2 is calculated. Then, the luminance data D2 having the highest similarity is selected.

In contrast, the following calculation is also possible. One of the luminance data D2 is selected, and similarity between the selected luminance data D2 and each luminance data D1 is calculated, and then the luminance data D1 having the highest similarity is selected. The inclinations θ1 and θ2 can be obtained from a difference between the image pickup position P2 (raw position X and raw position Y) associated with the selected luminance data D1 and the image pickup position P2 (raw position X and raw position Y) associated with the selected luminance data D2. That is, the inclination θ1 corresponds to a difference in position X, and the inclination θ2 corresponds to a difference in position Y.

FIG. 11 is a flow chart for illustrating processing for obtaining the inclinations θ1 and θ2 of the optical axis R of the image pickup device. The processing illustrated in FIG. 11 may be performed one or more times upon shipment of the luminous body measurement apparatus 10, or performed by a user at any timing after the shipment. In this processing, first, the first arm 30 and the second arm 40 are set in the non-inverted posture to obtain the luminance data D1 of the sample 80 at a large number of image pickup positions P2 in the image pickup regions Q3 and Q4 (Step S101). After that, the second arm 40 is set in the retreated posture, and the first arm 30 is inverted, and then the first arm 30 and the second arm 40 are set in the inverted posture. Then, under the inverted posture, the luminance data D2 of the sample 80 is obtained at a large number of image pickup positions P2 in the image pickup regions Q3 and Q4 (Step S102). After that, pattern matching processing is performed on the luminance data D1 and the luminance data D2 to select the most similar pair of luminance data. Then, the inclinations θ1 and θ2 are calculated from a difference between the image pickup positions P2 associated with the selected pair of luminance data D1 and D2 (Step S103). The calculated inclinations θ1 and θ2 are stored in the control unit 90.

Figure 12:
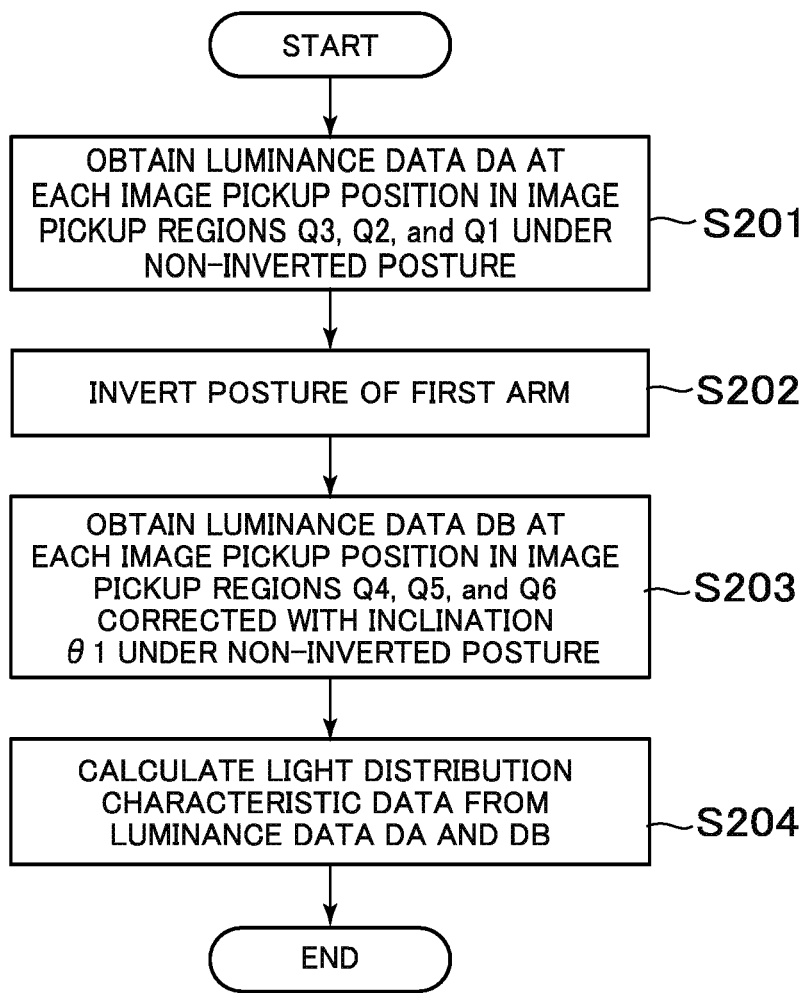
FIG. 12 is a flow chart for illustrating control performed by the luminous body measurement apparatus according to the embodiment of the present disclosure.

FIG. 12 is a flow chart for illustrating processing of measuring light distribution characteristic by the luminous body measurement apparatus 10. At the starting point of measurement, the first arm 30 and the second arm 40 are in the non-inverted posture, and the first arm 30 is in the upright posture. When the measurement is started, the control unit 90 obtains luminance data DA of the sample 80 at each image pickup position P2 in the image pickup regions Q3, Q2, and Q1 under the non-inverted posture (Step S201). For example, each time the second arm 40 is driven to rotate forward by fine angle, the first arm 30 is driven to rotate forward or reversely by the fine angle at a time within a range of 180 degrees in total, that is, 90 degrees to the right and 90 degrees to the left from the upright posture as the reference posture. With this, the image pickup position P2 is moved by the fine angle each along the first circular trajectory (scanning operation). Then, the control unit 90 obtains the luminance data DA of the sample 80 at each image pickup position P2, and stores the respective luminance data DA in association with data of a corresponding image pickup position P2 at which the luminance data DA has been obtained. At this time, out of the data of each image pickup position P2, data of the position X is added with 82 and stored.

Next, the control unit 90 sets the second arm 40 in the retreated posture, and the first arm 30 is inverted, and then the first arm 30 and the second arm 40 are set in the inverted posture (S202).

Next, the control unit 90 obtains, in the same manner as in Step S201, luminance data DB of the sample 80 at each image pickup position P2 in the image pickup regions Q4, Q5, and Q6 under the inverted posture this time (Step S203). At this time, out of data indicating a current image pickup position P2, data of the position X is corrected by adding θ1 to its raw value. Then, the posture of the second arm 40 is controlled so that the resultant value falls within the image pickup regions Q4, Q5, and Q6. As for data of the image pickup position P2 to be associated with the obtained luminance data DB, the data thus corrected is associated therewith and stored.

After that, light distribution characteristic data is generated in accordance with the near-field distribution method based on the stored luminance data DA and DB of each image pickup position P2. This processing is publicly known, and hence a detailed description thereof is omitted (Step S204).

According to the above-mentioned luminous body measurement apparatus 10, the image pickup position P2 is set closer to the reference position P1 to reduce the measurement sphere 100 as much as possible, and hence the apparatus can be downsized. In this case, in order to increase the optical path length from the reference position P1 to the image pickup element 36, the image pickup device includes mirrors 34 and 35, and the image pickup element 36 is placed on the side opposite to the mirror 35 across the axis A1. With this, a working distance required for use of an objective lens having high magnification can be secured while the measurement sphere 100 itself is reduced in size. On the contrary, this arrangement leads to an increase in size of the image pickup device and thus to an increase in size of the first arm 30. Consequently, with this configuration, the first arm 30 is liable to interfere with the holding portion 50. To address this, in this embodiment, the first arm 30 and the second arm 40 are suitably set in the non-inverted posture and the inverted posture so that in a wide range including the image pickup regions Q1 to Q6, the luminance data of the sample 80 can be obtained without any interference of the first arm 30 with the holding portion 50. In particular, when luminance data of the sample 80 is to be obtained in the wide range of the measurement sphere 100, it is conceivable to rotate the sample 80. With this configuration, however, disconnection of the power supply wiring of the sample 80 and other troubles may occur. According to the luminous body measurement apparatus 10 of the present disclosure, it is not required to move the sample 80, and hence such a trouble can be avoided.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A luminous body measurement apparatus comprising:
   an image pickup device configured to obtain luminance data of a luminous body;
   a first arm, which is provided so as to be pivotable by 360 degrees about a first axis set to be directed to a reference position at a distant position from the reference position, and which is configured to hold the image pickup device so as to obtain luminance data of the luminous body placed at the reference position, at each image pickup position on a first circular trajectory that passes a measurement sphere centered on the reference position, and that is perpendicular to the first axis and has the same diameter as the measurement sphere;
   a second arm, which includes a supporting portion configured to support the first arm so that the first arm is pivotable about the first axis, which is provided so as to be pivotable by 180 degrees or more about a second axis extending through the reference position and being perpendicular to the first axis, and which is configured to turn the first axis along a second circular trajectory that passes the measurement sphere, and that is perpendicular to the second axis and has the same diameter as the measurement sphere, with the first axis being directed to the reference position;

a holding portion which is located on the second circular trajectory, and extends toward the reference position side to hold the luminous body at the reference position; and a control unit, which is configured to pivot the first arm and the second arm in a first posture in a range causing no interference with the holding portion to obtain luminance data of the luminous body at a plurality of the image pickup positions in a first region of the measurement sphere, and is configured to pivot the first arm and the second arm in a second posture in a range causing no interference with the holding portion to obtain luminance data of the luminous body at a plurality of the image pickup positions in a second region adjacent to the first region on one side of the second axis as viewed from a position of the holding portion, the first posture being a posture under which the supporting portion is located on one side of the second axis as viewed from the holding portion, and the image pickup position of the first arm is located at a more distant position from the holding portion than the supporting portion as viewed from the holding portion, the second posture being a posture under which the supporting portion is located on another side of the second axis as viewed from the holding portion, and the image pickup position of the first arm is located at a more distant position from the holding portion than the supporting portion as viewed from the holding portion.

2. The luminous body measurement apparatus according to claim 1, wherein the first region includes a region in which the first arm interferes with the holding portion when the image pickup position is to be located in the first region under the second posture, and wherein the second region includes a region in which the first arm interferes with the holding portion when the image pickup position is to be located in the second region under the first posture.

3. The luminous body measurement apparatus according to claim 1, wherein the control unit is configured to set the first arm and the second arm in the first posture, and then set the second arm in a retreated posture and move the image pickup position of the first arm to an opposite side with respect to the supporting portion of the second arm, to set the first arm and the second arm in the second posture, the retreated posture being a posture under which even when the first arm is rotated by 360 degrees, the first arm causes no interference with the holding portion.

4. The luminous body measurement apparatus according to claim 1, wherein the holding portion includes an adjustment mechanism configured to adjust a position of the luminous body.

5. The luminous body measurement apparatus according to claim 1, wherein the image pickup device includes an image pickup element and one or more mirrors arranged between the image pickup position and the image pickup element.

6. The luminous body measurement apparatus according to claim 5, wherein the one or more mirrors include:

a first mirror, which is provided on a line connecting the reference position and the image pickup position, and is configured to receive light from the luminous body and reflect the light in a direction toward the supporting portion side out of directions of the first axis; and a second mirror configured to receive the light reflected by the first mirror and reflect the light toward the image pickup element side.

7. The luminous body measurement apparatus according to claim 6, wherein the image pickup element and the second mirror are arranged on opposite sides across the first axis.

8. The luminous body measurement apparatus according to claim 1, wherein the control unit is configured to change at least one of the image pickup position to be associated with luminance data obtained when the first arm and the second arm are in the first posture, or the image pickup position to be associated with luminance data obtained when the first arm and the second arm are in the second posture, in accordance with an inclination of an actual image pickup direction of the image pickup device with respect to a direction from the image pickup position to the reference position.

9. The luminous body measurement apparatus according to claim 8, wherein the control unit is configured to set the first arm and the second arm in the first posture to obtain luminance data, set the first arm and the second arm in the second posture to obtain luminance data, in overlapping regions of the measurement sphere, and calculate the inclination based on a result of comparing the obtained luminance data.

10. A luminous body measurement method using a luminous body measurement apparatus, the luminous body measurement apparatus including:
an image pickup device configured to obtain luminance data of a luminous body;

a first arm, which is provided so as to be pivotable by 360 degrees about a first axis set to be directed to a reference position at a distant position from the reference position, and which is configured to hold the image pickup device so as to obtain luminance data of the luminous body placed at the reference position, at each image pickup position on a first circular trajectory that passes a measurement sphere centered on the reference position, and that is perpendicular to the first axis and has the same diameter as the measurement sphere;

a second arm, which includes a supporting portion configured to support the first arm so that the first arm is pivotable about the first axis, which is provided so as to be pivotable by 180 degrees or more about a second axis extending through the reference position and being perpendicular to the first axis, and which is configured to turn the first axis along a second circular trajectory that passes the measurement sphere, and that is perpendicular to the second axis and has the same diameter as the measurement sphere, with the first axis being directed to the reference position; and a holding portion which is located on the second circular trajectory, and also extends toward the reference position side to hold the luminous body at the reference position, the luminous body measurement method comprising:
pivoting the first arm and the second arm in a first posture in a range causing no interference with the holding portion to obtain luminance data of the luminous body at a plurality of the image pickup positions in a first region of the measurement sphere, and pivoting the first arm and the second arm in a second posture in a range causing no interference with the holding portion to obtain luminance data of the luminous body at a plurality of the image pickup positions in a second region adjacent to the first region on one side of the second axis as viewed from a position of the holding portion, the first posture being a posture under which the supporting portion is located on one side of the second axis as viewed from the holding portion, and the image pickup position of the first arm is located at a more distant position from the holding portion than the supporting portion as viewed from the holding portion, the second posture being a posture under which the supporting portion is located on another side of the second axis as viewed from the holding portion, and the image pickup position of the first arm is located at a more distant position from the holding portion than the supporting portion as viewed from the holding portion.

\* \* \* \* \*